United States Patent
Seo

(10) Patent No.: US 7,603,512 B2
(45) Date of Patent: Oct. 13, 2009

(54) DYNAMIC MEMORY REFRESH CONTROLLER, MEMORY SYSTEM INCLUDING THE SAME AND METHOD OF CONTROLLING REFRESH OF DYNAMIC MEMORY

(75) Inventor: Yoon-Bum Seo, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 423 days.

(21) Appl. No.: 11/676,585

(22) Filed: Feb. 20, 2007

(65) Prior Publication Data

US 2007/0198771 A1 Aug. 23, 2007

(30) Foreign Application Priority Data

Feb. 22, 2006 (KR) .................. 10-2006-0017086

(51) Int. Cl.
*G06F 12/00* (2006.01)
(52) U.S. Cl. .................. 711/106; 711/151; 711/157; 711/167; 711/170
(58) Field of Classification Search .................. 711/106, 711/151, 157, 167, 170
See application file for complete search history.

(56) References Cited

U.S. PATENT DOCUMENTS

| | | | |
|---|---|---|---|
| 5,500,827 A | | 3/1996 | Yazdy et al. |
| 5,507,005 A | * | 4/1996 | Kojima et al. .................. 710/52 |
| 5,822,265 A | | 10/1998 | Zdenek |
| 6,334,167 B1 | | 12/2001 | Gerchman et al. |
| 6,412,048 B1 | * | 6/2002 | Chauvel et al. ............. 711/158 |
| 2002/0069319 A1 | * | 6/2002 | Lee et al. .................... 711/106 |

FOREIGN PATENT DOCUMENTS

KR 2003-0071783 9/2003

* cited by examiner

*Primary Examiner*—Stephen C Elmore
(74) *Attorney, Agent, or Firm*—F. Chau & Associates, LLC

(57) ABSTRACT

A dynamic memory refresh controller includes a first in first out (FIFO) memory, a scheduler, a refresh control unit, and a signal generator. The FIFO memory stores and manages requests from a master device. The scheduler reorders the requests from the master device based on priorities assigned to the master device or provides information about following requests. The refresh control unit determines a refresh timing of the dynamic memory based on the existence of the following requests and an idle state of banks constituting the dynamic memory. Accordingly, the dynamic memory refresh controller may maximize a refresh trigger interval by changing the management order of the requests from the master device based on the priority of the response latency.

23 Claims, 9 Drawing Sheets

DYNAMIC MEMORY REFRESH CONTROLLER, MEMORY SYSTEM INCLUDING THE SAME AND METHOD OF CONTROLLING REFRESH OF DYNAMIC MEMORY

CROSS-REFERENCE TO RELATED APPLICATION

This application claims priority under 35 USC § 119 to Korean Patent Application No. 2006-17086, filed on Feb. 22, 2006 in the Korean Intellectual Property Office, the disclosure of which is incorporated herein in its entirety by reference.

BACKGROUND OF THE INVENTION

1. Technical Field

The present disclosure relates to a memory controller and, more particularly, to a dynamic memory refresh controller, a system including the same and a method of controlling refresh of dynamic memory.

2. Discussion of Related Art

Most system-on-chip (SOC) devices use some form of synchronous dynamic random-access memory (SDRAM), which has high density and low price, as a main memory. Basic data storage cells of the SDRAM, such as double data rate (DDR) or single data rate (SDR) SDRAM, have dynamic characteristics and, thus, a refresh operation for preserving data is required. Since this type of refresh operation typically consumes a lot of power, however, similar to that of a large-scale read operation, a refresh operation consuming a more suitable amount of power is required.

Dynamic memory is required to be refreshed periodically, and a cell may preserve data for tens to hundreds of milliseconds without being lost. One row of each page is refreshed by one refresh trigger and, thus, a practical period of a refresh trigger corresponds to just a few microseconds. Items related to a maximum refresh interval time (tREFImax), are included in all SDRAM specifications. When the refresh interval exceeds tREFImax, the preservation of data may not be guaranteed. Therefore, a memory controller needs to be designed so that the refresh interval does not exceed tREFImax. In addition, when the refresh operation collides with a normal access operation, such as a read or write operation, the refresh operation may not be performed. Therefore, the refresh operation must be performed within a shorter interval than tREFImax. This results in the dynamic memory being excessively refreshed, and the power consumption of a system including the dynamic memory is increased.

Many refresh controllers have difficulties in optimizing the refresh trigger interval. Assuming that data is accessed by transitioning a column after accessing a row address, when the maximum refresh interval is encountered, a precharge command is executed immediately, and the refresh trigger needs to be performed. When the refresh operation is completed, the corresponding row needs to be activated, and a following column address is accessed. Therefore, the dynamic memory may not be accessed at high speed, because more time for the precharging and the row activations is needed.

Many refresh controllers prevent a refresh trigger during accessing of the dynamic memory for responding to requests from a master device. Therefore, data may be lost when a read/write operation is performed at tREFImax.

FIG. 1 is a diagram useful in explaining a conventional method for preventing loss of data.

Referring to FIG. 1, most refresh controllers have a minimum time of tREFI that is set by users, and the dynamic memory is refreshed by providing a refresh trigger signal to the dynamic memory as soon as an idle state of the dynamic memory occurs after the set tREFI. A short tREFI is set for stably preserving data.

Therefore, the whole refresh interval becomes short, and the refresh trigger occurs more frequently during a fixed time interval. This results in the power consumption of the whole system being severely increased.

SUMMARY OF THE INVENTION

Accordingly, exemplary embodiments of the present invention are provided to substantially obviate one or more problems due to limitations and disadvantages of the related art.

Exemplary embodiments of the present invention provide a dynamic memory refresh controller capable of maximizing a refresh interval of dynamic memory.

According to exemplary embodiments of the present invention provide, semiconductor memory system capable of reducing power consumption of the system by employing the dynamic memory refresh controller is provided.

Exemplary embodiments of the present invention provide a method of controlling a refresh of dynamic memory capable of maximizing a refresh interval of the dynamic memory.

In exemplary embodiments of the present invention, a dynamic memory refresh controller includes a first in first out (FIFO) memory, a scheduler, a refresh control unit, and a signal generator.

The FIFO memory stores and manages requests from a master device. The scheduler reorders the requests from the master device based on one of priorities assigned to the master device or provides information about following requests. The refresh control unit determines a refresh timing of the dynamic memory based on existence of the following requests and the idle state of banks constituting the dynamic memory. The signal generator generates a refresh trigger signal for refreshing the dynamic memory in response to a refresh control signal.

The refresh control unit may include a finite state machine (FSM) and a tREF counter. The FSM controls each bank of the dynamic memory. The tREF counter determines a refresh interval of the dynamic memory.

In exemplary embodiments, the tREF counter may monitor the following requests from the master device during a first time interval from tREFImax minus ACCESS_LENGTHmax to an ending point of tREFImax. TREFImax may represent a maximum refresh interval of the dynamic memory, and ACCESS_LENGTHmax may represent a maximum access interval of the requests of the master device.

The tREF counter may apply an interrupt signal for following requests to the FSM ahead of the first time interval. The interrupt signal may be activated at a starting point of the first time interval and deactivated at a delivery point subtracted from an ending point of the first time interval. The delivery point may represent a propagation time when the refresh trigger signal is propagated to the dynamic memory.

In exemplary embodiments, the scheduler may apply a REQ signal to the FSM during the first time interval, and the REQ signal may provide information about the following requests. The REQ signal may be activated when the following requests are found, and deactivated when the interrupt signal is deactivated.

In exemplary embodiments, the scheduler may provide a TIME_OUT signal to the FSM during the first time interval, and an activation of the TIME_OUT signal may be determined based on the existence of the following requests. The TIME_OUT signal may be activated at a deactivation point of the interrupt signal and deactivated at the ending point of the first time interval, when the following requests are not found during the first time interval.

According to exemplary embodiments, the FSM may provide the refresh control signal to the signal generator when all banks of the dynamic memory are in an idle state and when the TIME_OUT signal is activated.

In exemplary embodiments, the FSM may provide the refresh control signal to the signal generator when all banks of the dynamic memory are in an idle state and when the REQ signal is activated.

According to exemplary embodiments, the scheduler may change a management order of the requests in the FIFO memory at a point when the interrupt signal is provided from the tREF counter. The scheduler may provide a priority to the master device, and the priority may be determined based on sensitivity to a response latency of the requests. The scheduler may change the management order of the requests in the FIFO memory based on the determined priority. The scheduler may change the management order of the requests in the FIFO memory during the activation interval of the interrupt signal when the tREF counter provides the interrupt signal to the FSM.

In exemplary embodiments of the present invention, a semiconductor memory system includes at least one dynamic memory that stores data, master devices that access the at least one dynamic memory, a refresh controller that controls a refresh of the at least one dynamic memory, and a plurality of buses that connect the dynamic memory and the refresh controller and the master device.

According to exemplary embodiments of the present invention, a method of controlling a refresh of dynamic memory includes storing requests from a master device to manage the requests, reordering the requests based on one of priorities assigned to the master device or providing information about following requests, determining a refresh timing of the dynamic memory based on existence of the following requests and an idle state of banks that constitute the dynamic memory and generating a refresh trigger signal that refreshes the dynamic memory. Determining the refresh timing of the dynamic memory may include controlling each bank of the dynamic memory and determining a refresh interval of the dynamic memory.

In exemplary embodiments, the refresh interval of the dynamic memory may be determined based on monitoring the following requests during a first time interval from tREFImax minus ACCESS_LENGTHmax to an ending point of tREFImax. TREFImax may represent a maximum refresh interval of the dynamic memory, and ACCESS_LENGTHmax may represent a maximum access interval of the requests of the master device.

According to exemplary embodiments, the requests may be reordered or the information about the following requests may be provided based on the existence of the following requests.

In exemplary embodiments, the priority given to the master device may be determined based on sensitivity to a response latency of the requests.

In exemplary embodiments, a management order may be changed based on the determined priority.

According to exemplary embodiments, the dynamic memory may be refreshed when all banks of the dynamic memory are in an idle state and when the following requests are not found during the first time interval.

In exemplary embodiments, the dynamic memory may be refreshed when all banks of the dynamic memory are in an idle state and at a point when the following requests are found.

Accordingly, the dynamic memory refresh controller according to an exemplary embodiment of the present invention may maximize a refresh trigger interval by changing the management order of the requests from the master device based on the priority of the response latency.

BRIEF DESCRIPTION OF THE DRAWINGS

Exemplary embodiments of the present invention will be understood in more detail from the following description taken in conjunction with the attached drawings.

DESCRIPTION OF EXEMPLARY EMBODIMENTS

Figure 1:
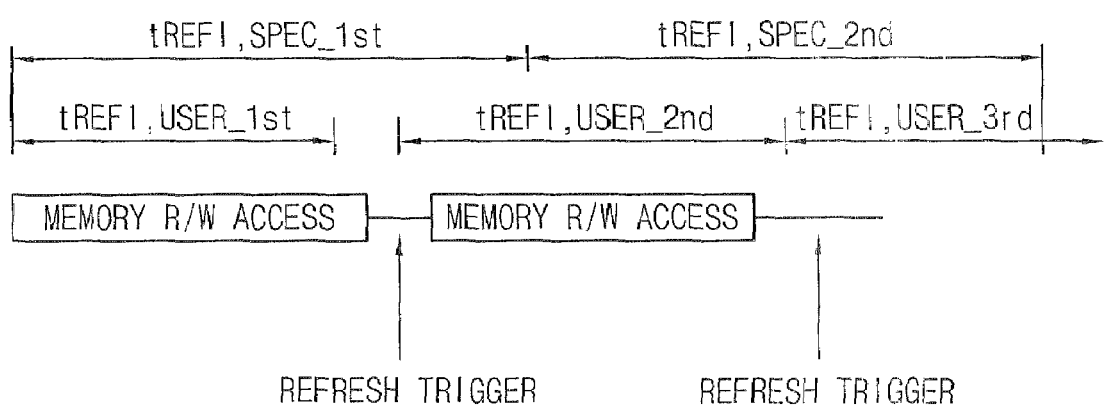
FIG. 1 is a diagram illustrating a conventional method for preventing loss of data.

Exemplary embodiments of the present invention now will be described more fully with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. Like reference numerals refer to like elements throughout this application.

Figure 2:
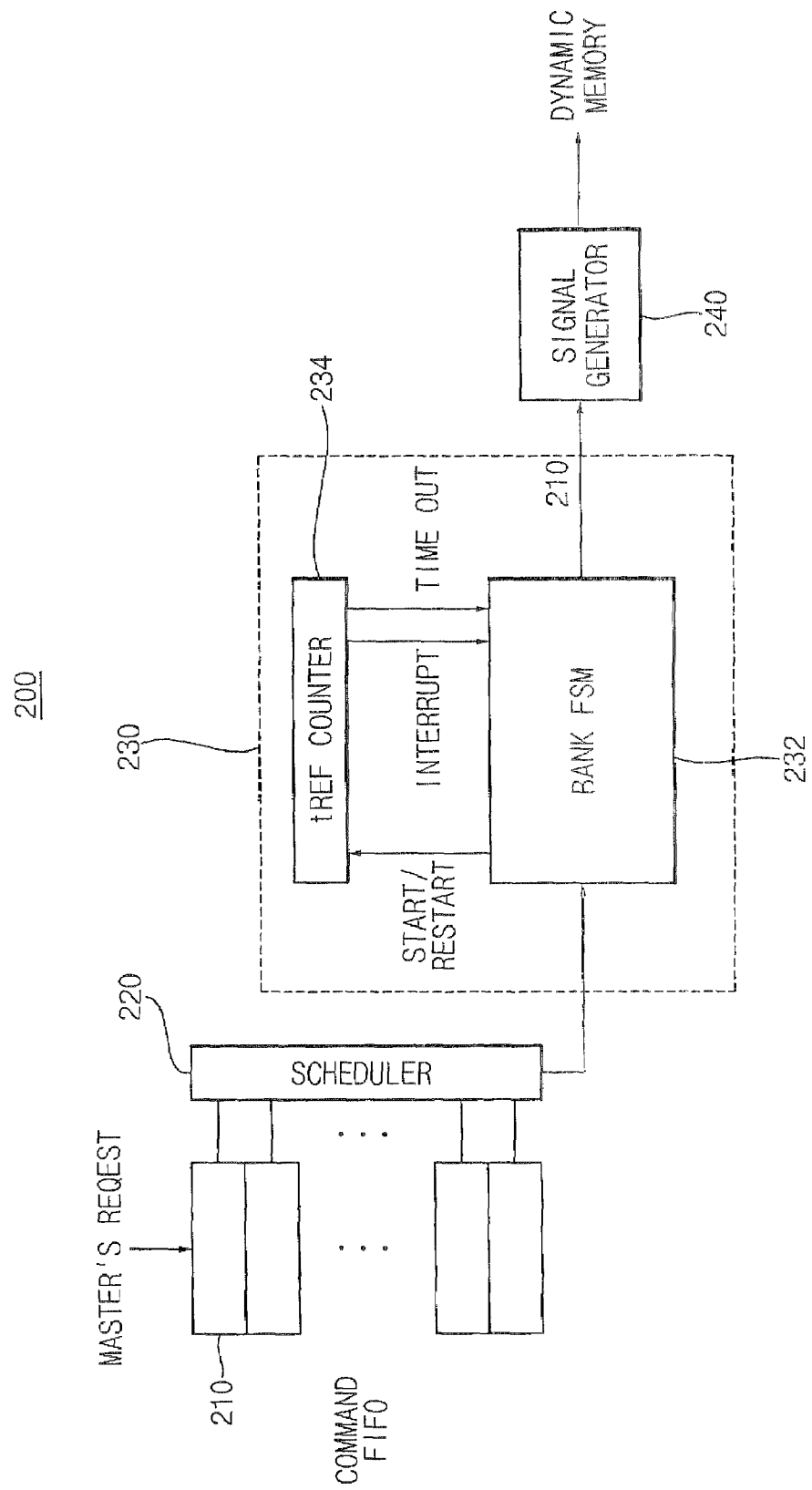
FIG. 2 is a block diagram illustrating a structure of a dynamic memory refresh controller according to an exemplary embodiment of the present invention.

FIG. 2 is a block diagram illustrating a structure of a dynamic memory refresh controller according to an exemplary embodiment of the present invention.

Referring to FIG. 2, the dynamic memory refresh controller 200 includes a first in first out (FIFO) memory 210, a scheduler 220, a refresh control unit 230, and a signal generator 240.

The FIFO 210 stores and manages requests from a master device (not shown). The scheduler 220 reorders the requests from the master device based on priorities assigned to the master device or provides information about following requests. The refresh control unit 230 determines a refresh timing of the dynamic memory based on the existence of the following requests and the idle state of the banks constituting the dynamic memory. The signal generator 240 generates a refresh trigger signal for refreshing the dynamic memory in response to a refresh control signal.

The refresh control unit 230 includes a finite state machine (FSM) 232 and a tREF counter 234. The FSM 232 controls each bank of the dynamic memory. The tREF counter 234 determines a refresh interval of the dynamic memory.

The tREF counter 234 monitors the following requests from the master device during a first time interval from tREFImax minus ACCESS_LENGTHmax to an ending point of tREFImax. TREFImax represents a maximum refresh interval of the dynamic memory, and ACCESS_LENGTHmax represents a maximum access interval of the requests of the master device.

Figure 3:
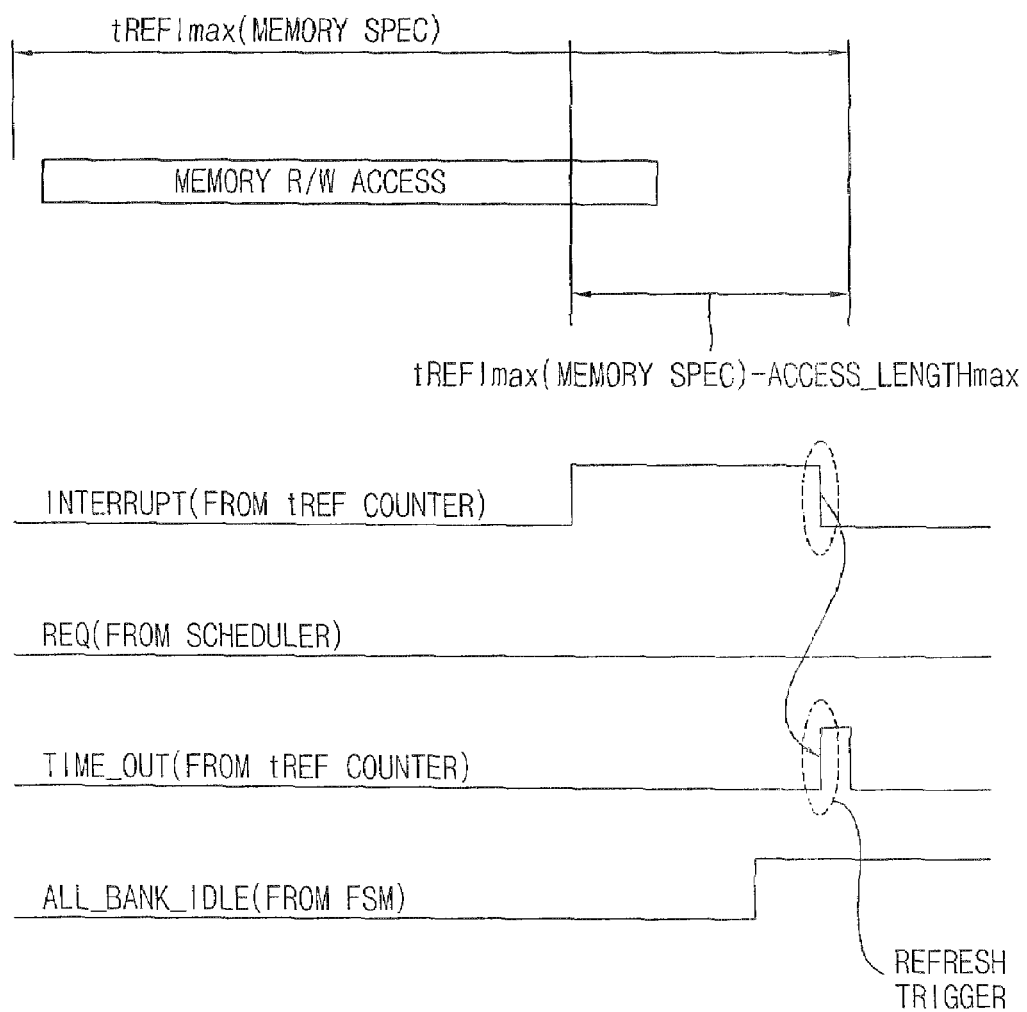
FIG. 3 is a timing diagram illustrating an operation of the refresh controller when there is no following request from the master device during the first time interval.

FIG. 3 is a timing diagram illustrating an operation of the refresh controller when there is no following request from the master device during the first time interval.

Referring to FIG. 3, the tREF counter 234 provides an interrupt signal to the FSM 232 for the following requests at the starting point of the first time interval or before the starting point of the first time interval. The interrupt signal is activated at the starting point of the first time interval and deactivated at a delivery point subtracted from the ending point of the first time interval. The delivery point represents a propagation time when the refresh trigger signal is propagated to the dynamic memory. When there is no following request during an activation interval of the interrupt signal, the tREF counter 234 provides a TIME_OUT signal to the FSM 232 at the ending point of the activation interval of the interrupt signal. The TIME_OUT signal represents that there is no following request from the master device. The TIME_OUT signal is activated at a deactivation point of the interrupt signal and deactivated at the ending point of the first time interval.

The FSM 232 determines whether all banks of the dynamic memory are in idle states, and provides the refresh control signal to the signal generator 240. The signal generator 240 starts the refresh operation of the dynamic memory at the activation point of the TIME_OUT signal and finishes the refresh operation of the dynamic memory at the ending point of the first time interval.

Figure 4:
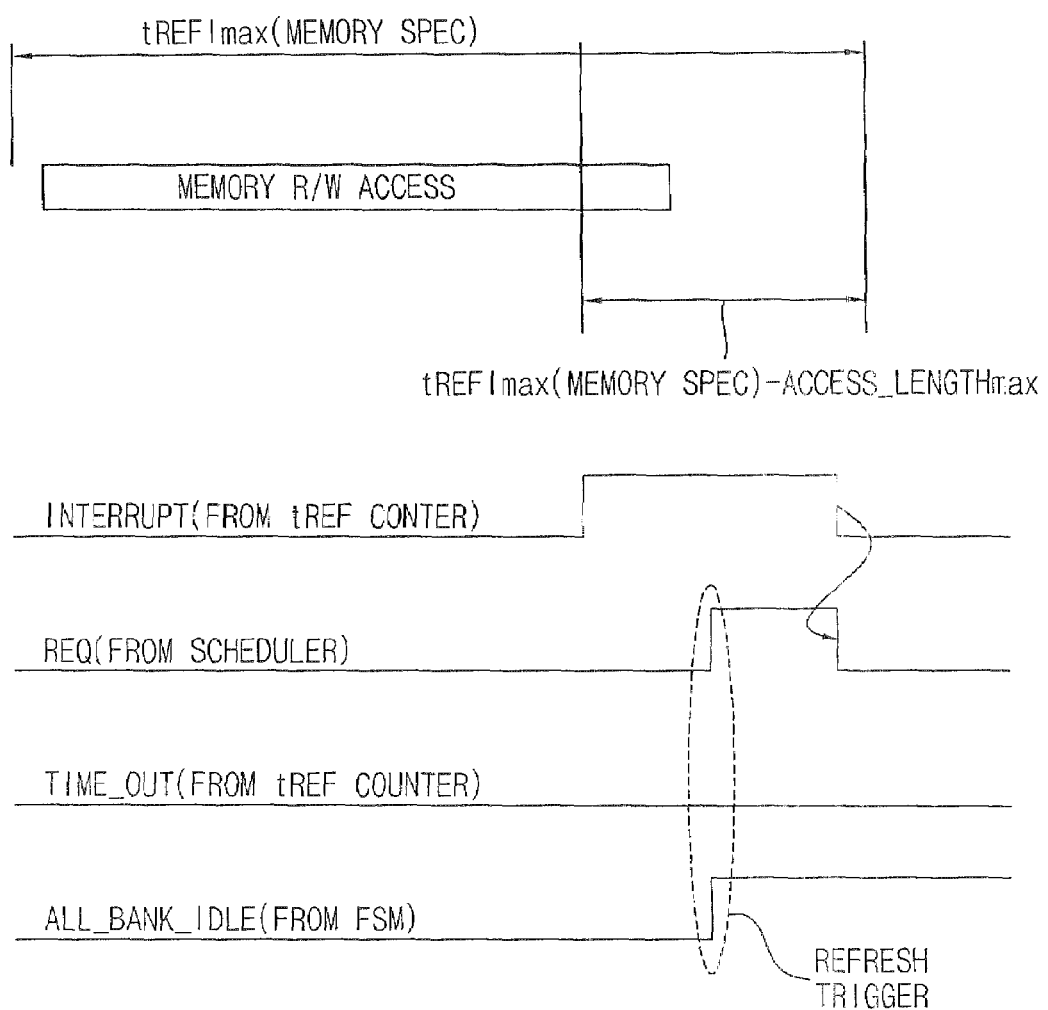
FIG. 4 is a timing diagram illustrating an operation of the refresh controller when there is a following request from the master device during the first time interval.

FIG. 4 is a timing diagram illustrating an operation of the refresh controller when there is a following request from the master device during the first time interval.

Referring to FIG. 4, when there is at least one request from the master device during the first time interval, the scheduler 220 provides a REQ signal to the FSM 232 as soon as the following request is found. The FSM 232 provides the refresh control signal to the signal generator 240 when all banks of the dynamic memory are in an idle state. The signal generator 240 performs the refresh operation of the dynamic memory. In this case, because the refresh operation has already been performed, the TIME_OUT signal is not activated. Instead, the FSM 232 provides a START signal to the tREF counter 234 after a tRFC, a latency caused by the refresh operation, and the tREF counter 234 monitors tREFI.

In some cases, there are many accesses of the master device to the dynamic memory around the ending point of tREFImax. The conventional method monitors the idle state of the banks for a long interval, and performs a refresh trigger when all banks are in an idle state.

In most systems-on-chips (SOCs), each master device has a different sensitivity to the response latency of the requests. Exemplary embodiments of the present invention provide priorities to the master device, and the priorities are determined based on the sensitivity to the response latency of the requests from the master device. When there is a request from the master device with a higher priority, the scheduler 220 reorders the requests in the FIFO 210 by advancing the request from the master device with higher priority ahead of the requests from a master device with lower priority. In this way, the request from the master device with higher priority may not be affected by the tRFC if possible.

Figure 5:
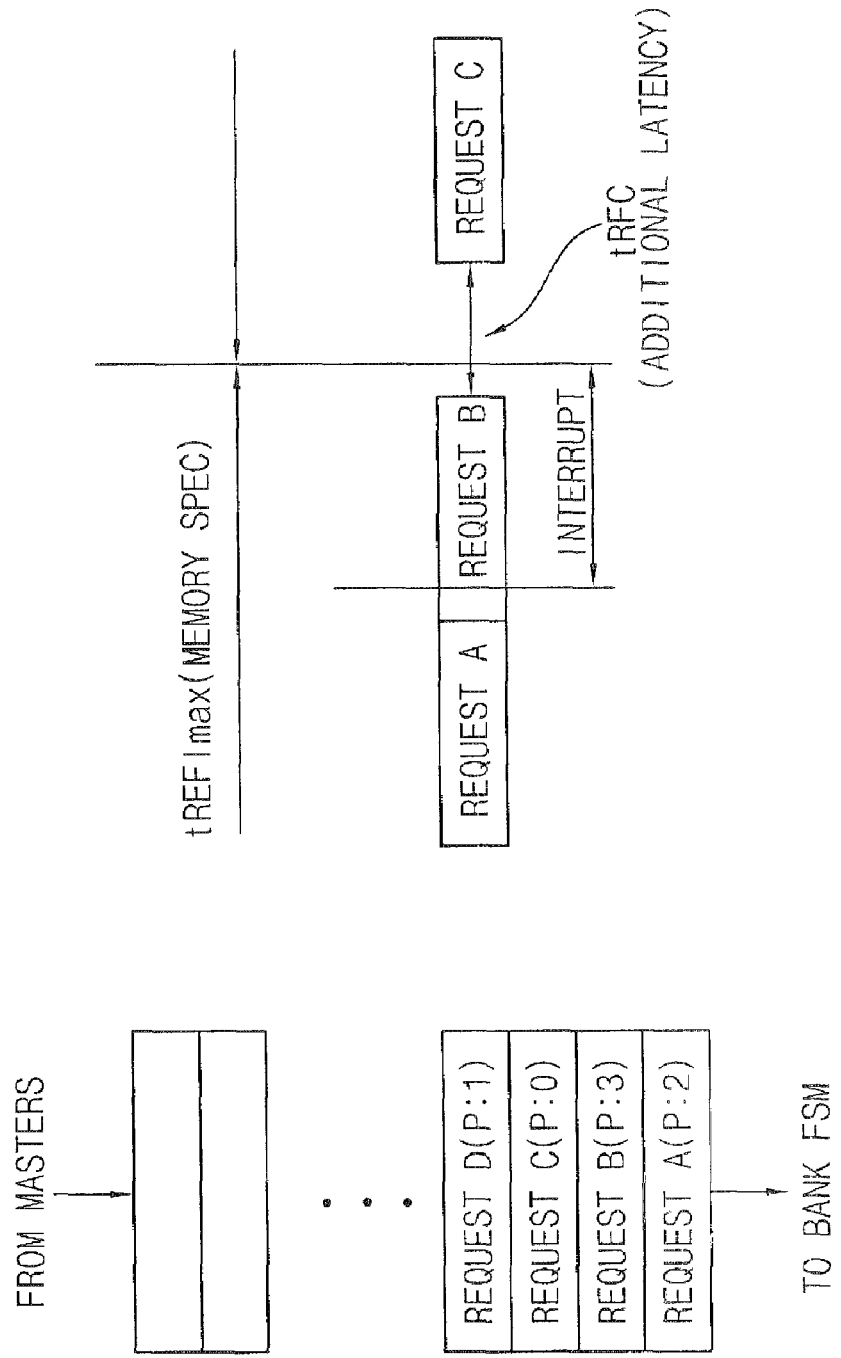
FIG. 5 is a diagram illustrating that the request from the master device is executed after the refresh trigger because of additional response latency.

FIG. 5 is a diagram illustrating that the request from the master device is executed after the refresh trigger because of additional response latency.

Referring to FIG. 5, when Request C has the highest priority and Request C is accessed after tREFImax, the dynamic memory is burdened by the tRFC as the additional latency for refreshing the dynamic memory. In this case, Request C is not executed at a proper time, the performance of the dynamic memory may be degraded, or the dynamic memory may have some errors.

Figure 6:
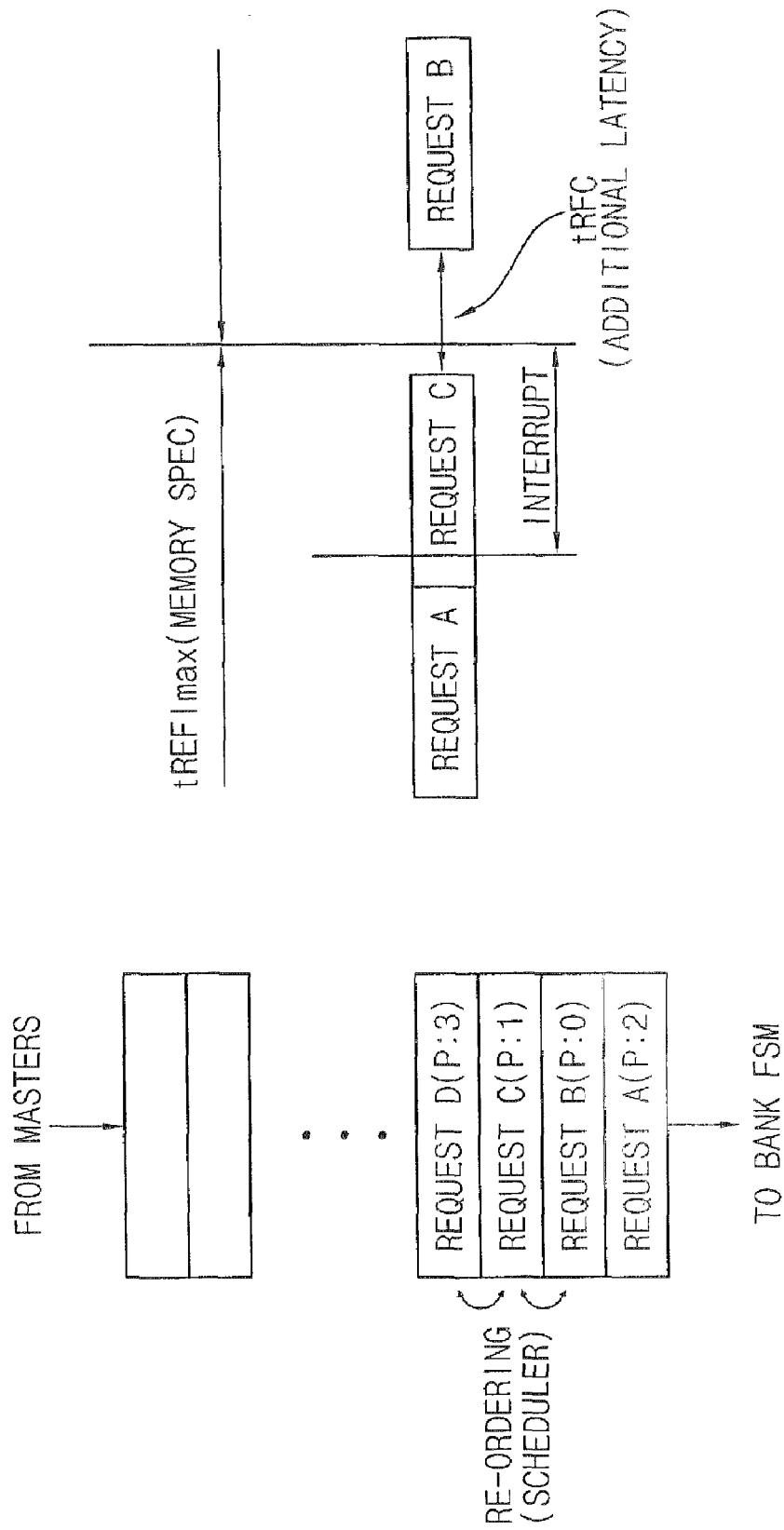
FIG. 6 is a diagram illustrating that a request from the master device with higher priority is not affected by the tRFC according to an exemplary embodiment of the present invention.

FIG. 6 is a diagram illustrating that a request from the master device with higher priority is not affected by the tRFC to an exemplary embodiment of the present invention.

Referring to FIG. 6, when the requests are heavily accessed around the ending point of tREFImax, the scheduler 220 changes the management order of the request so that Request C from the master device with the highest priority may not be affected by the tRFC. Then, Request C is executed ahead of the ending point of tREFImax. Therefore, the performance of the dynamic memory will not be degraded, or the dynamic memory will not have errors.

Figure 7:
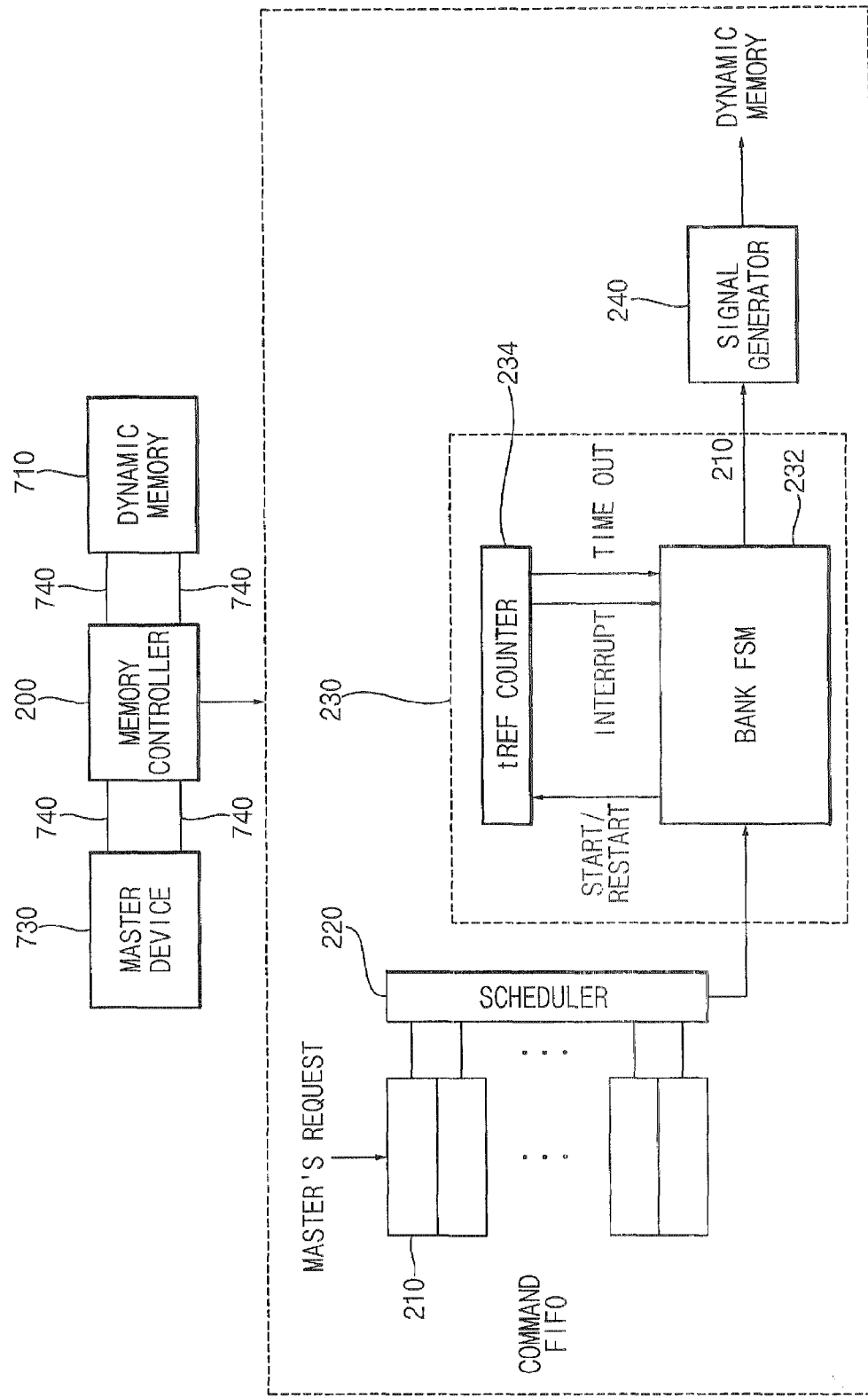
FIG. 7 is a block diagram illustrating a semiconductor memory system according to an exemplary embodiment of the present invention.

FIG. 7 is a block diagram illustrating a semiconductor memory system according to an exemplary embodiment of the present invention.

Referring to FIG. 7, the semiconductor memory system includes a dynamic memory 710 that stores data, a dynamic memory refresh controller 200 that controls a refresh of the dynamic memory 710, a master device 730 that accesses the dynamic memory 710, and a plurality of buses 740 that connect the dynamic memory 710 and the dynamic memory refresh controller 200 and the master device 730.

The dynamic memory refresh controller 200 includes a FIFO memory 210, a scheduler 220, a refresh control unit 230, and a signal generator 240. The refresh control unit 230 includes a finite state machine (FSM) 232 and a tREF counter 234.

The FIFO memory 210 stores and manages requests from the master device 730. The scheduler 220 reorders the requests from the master device 730 based on priorities assigned to the master device 730 or provides information about following requests. The refresh control unit 230 determines a refresh timing of the dynamic memory 710 based on the existence of the following requests and the idle state of the banks constituting the dynamic memory 710. The signal generator 240 generates a refresh trigger signal for refreshing the dynamic memory 710 in response to a refresh control signal. The FSM 232 controls each bank of the dynamic memory 710. The tREF counter 234 determines a refresh interval of the dynamic memory 710.

Figure 8:
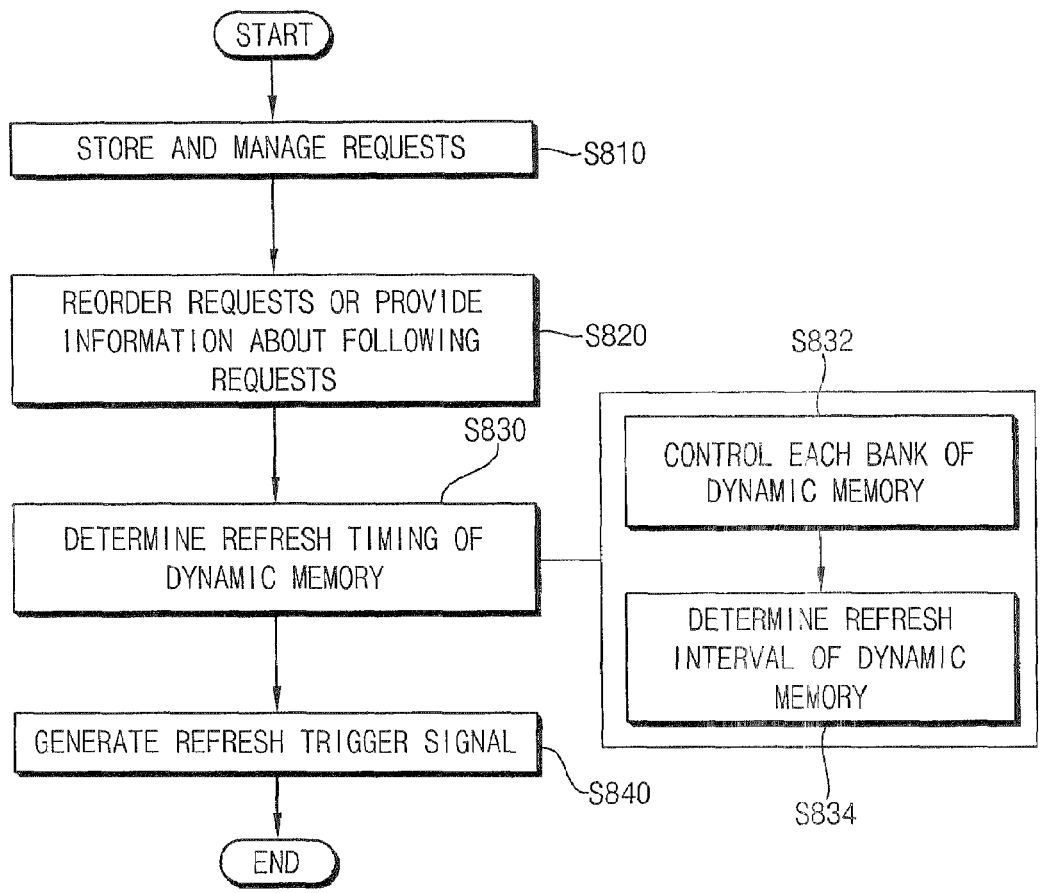
FIG. 8 is a flow chart illustrating a method of controlling refresh of dynamic memory according to an exemplary embodiment of the present invention.

FIG. 8 is a flow chart illustrating a method of controlling a refresh of dynamic memory according to an exemplary embodiment of the present invention.

Referring to FIG. 8, the method of controlling refresh of the dynamic memory includes storing requests from a master device to manage the requests (step S810), reordering the requests based on priorities assigned to the master device or providing information about following requests (step S820), determining a refresh timing of the dynamic memory based on the existence of the following requests and the idle state of banks that constitute the dynamic memory (step S830), and generating a refresh trigger signal that refreshes the dynamic memory (step S840).

Determining the refresh timing of the dynamic memory (step S830) includes controlling each bank of the dynamic memory (step S832) and determining a refresh interval of the dynamic memory (step S834).

The refresh interval of the dynamic memory may be determined based on monitoring the following requests during a first time interval from tREFImax minus ACCESS_LENGTHmax to an ending point of tREFImax. TREFImax represents a maximum refresh interval of the dynamic memory, and ACCESS_LENGTHmax represents a maximum access interval of the requests of the master device. The requests are reordered or the information about the following requests is provided based on the existence of the following requests. The priority given to the master device is determined based on sensitivity to a response latency of the requests. A management order is changed based on the determined priority.

The dynamic memory is refreshed when all banks of the dynamic memory are in an idle state and when the following requests are not found during the first time interval. The dynamic memory is also refreshed when all banks of the dynamic memory are in an idle state and at a point when the following requests are found.

Figure 9:
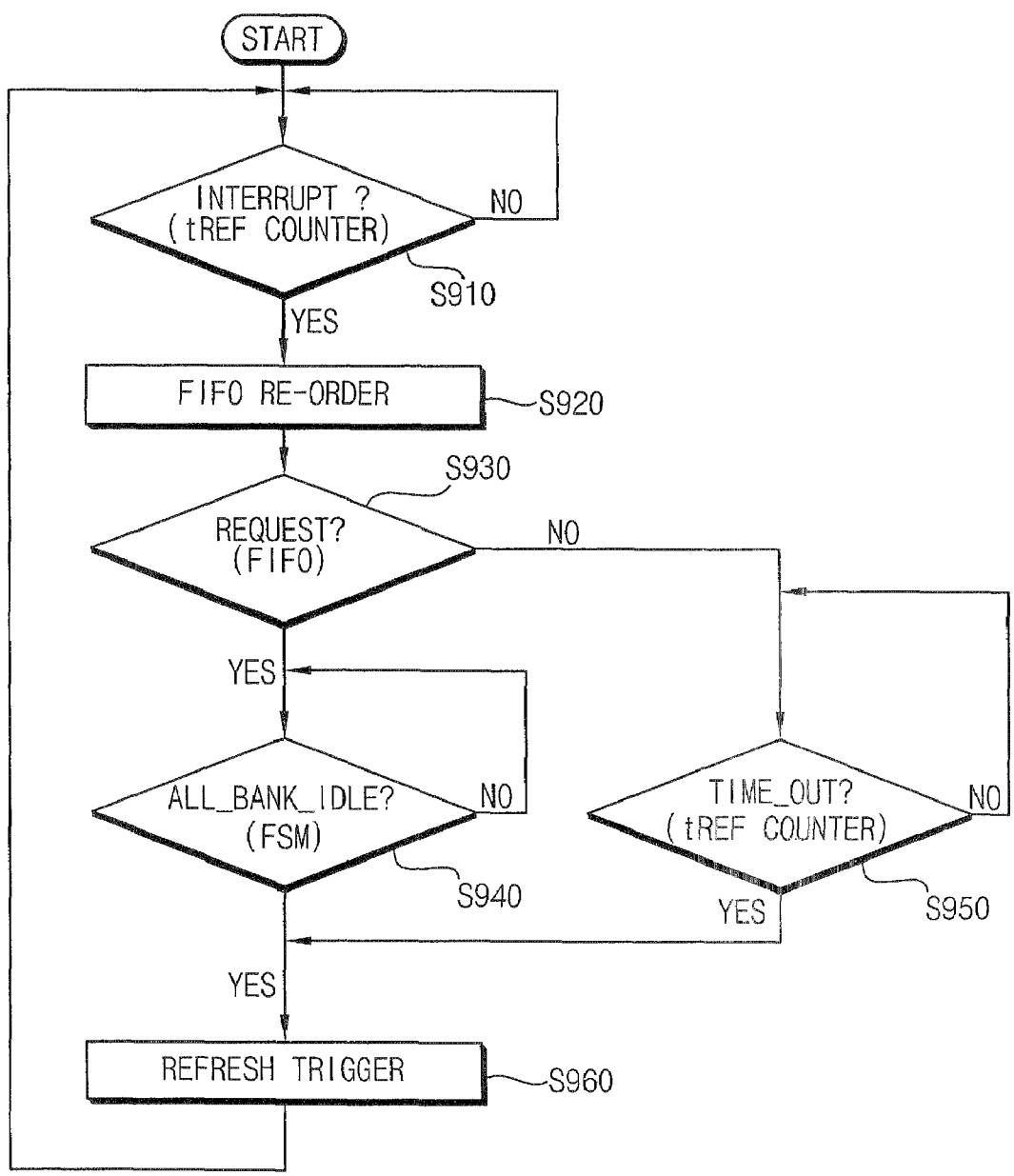
FIG. 9 is an overall flow chart illustrating a method of controlling refresh of dynamic memory according to an exemplary embodiment of the present invention.

FIG. 9 is an overall flow chart illustrating a method of controlling refresh of dynamic memory according to an exemplary embodiment of the present invention.

Hereinafter, the overall operation of the dynamic memory refresh controller and the method of controlling refresh of the dynamic memory will be explained with reference to FIGS. 2 through 9.

Referring to FIGS. 2 through 9, the tREF counter 234 provides an interrupt signal for following requests to the FSM 233 (step S910). The scheduler 220 changes the management order of the requests according to priorities assigned to the master device 730 (step S920). The scheduler 220 determines whether there are following requests from the master device 730 in the FIFO memory 210 (step S930). When there is no following request in the FIFO memory 210, the tREF counter 234 provides the TIME_OUT signal to the FSM 232 (step S950). When there is at least one following request from the master device 730 in the FIFO memory 210, the scheduler 220 provides the REQ signal FSM 232. The FSM 232 determines whether all banks of the dynamic memory 710 are in an idle state (step S940). When all banks of the dynamic memory are in an idle state, the FSM 232 provides the refresh control signal to the signal generator 240, and the dynamic memory is refreshed (step S960).

As described above, the dynamic memory refresh controller according to an exemplary embodiment of the present invention may maximize a refresh trigger interval by changing the management order of the requests from the master device based on the priority of the response latency.

The semiconductor memory system including the dynamic memory refresh controller according to an exemplary embodiment of the present invention may reduce the power consumption of the system by maximizing the refresh trigger interval.

The method of controlling refresh of the dynamic memory may maximize the refresh trigger interval and may prevent loss of data.

While exemplary embodiments of the present invention and their advantages have been described in detail, it should be understood that various changes, substitutions and alterations may be made herein without departing from the scope of the invention.

What is claimed is:

1. A dynamic memory refresh controller, comprising:
a first in first out (FIFO) memory configured to store and manage requests from a master device;
a scheduler configured to reorder the requests based on one of priorities assigned to the master device and provide information about following requests;
a refresh control unit configured to determine a refresh timing of dynamic memory based on existence of the following requests and the idle state of banks constituting the dynamic memory, the refresh control unit including:
a finite state machine (FSM) configured to control each bank of the dynamic memory; and
a tREF counter configured to determine a refresh interval of the dynamic memory; and
a signal generator configured to generate a refresh trigger signal that refreshes the dynamic memory.

2. The refresh controller of claim 1, wherein the tREF counter monitors the following requests from the master device during a first time interval from tREFImax minus ACCESS_LENGTHmax to an ending point of tREFImax, tREFImax representing a maximum refresh interval of the dynamic memory, wherein ACCESS_LENGTHmax represents a maximum access interval of the requests of the master device.

3. The refresh controller of claim 2, wherein the tREF counter applies an interrupt signal to the FSM for following requests ahead of the first time interval.

4. The refresh controller of claim 3, wherein the interrupt signal is activated at a starting point of the first time interval and deactivated at a delivery point subtracted from an ending point of the first time interval, the delivery point representing a propagation time when the refresh trigger signal is propagated to the dynamic memory.

5. The refresh controller of claim 4, wherein the scheduler applies a REQ signal to the FSM during the first time interval, the REQ signal providing information about the following requests.

6. The refresh controller of claim 5, wherein the REQ signal is activated when the following requests are found, and deactivated when the interrupt signal is deactivated.

7. The refresh controller of claim 5, wherein the scheduler provides a TIME_OUT signal to the FSM during the first time interval, and wherein an activation of the TIME_OUT signal is determined based on the existence of the following requests.

8. The refresh controller of claim 7, wherein when the following requests are not found during the first time interval, the TIME_OUT signal is activated at a deactivation point of the interrupt signal and deactivated at the ending point of the first time interval.

9. The refresh controller of claim 8, wherein the FSM provides the refresh control signal to the signal generator when all banks of the dynamic memory are in an idle state and when the TIME_OUT signal is activated.

10. The refresh controller of claim 5, wherein the FSM provides the refresh control signal to the signal generator when all banks of the dynamic memory are in an idle state and when the REQ signal is activated.

11. The refresh controller of claim 3, wherein the scheduler changes a management order of the requests in the FIFO memory at a point when the interrupt signal is provided from the tREF counter.

12. The refresh controller of claim 11, wherein the scheduler changes the management order of the requests in the FIFO memory at a point when the interrupt signal is activated.

13. The refresh controller of claim 12, wherein the scheduler provides a priority to the master device, the priority being determined based on sensitivity to a response latency of the requests.

14. The refresh controller of claim 13, the scheduler changes the management order of the requests in the FIFO memory based on the determined priority.

15. The refresh controller of claim 14, wherein the scheduler changes the management order of the requests in the FIFO memory during the activation interval of the interrupt signal when the tREF counter provides the interrupt signal to the FSM.

16. A semiconductor memory system, comprising:
at least one dynamic memory that stores data;
master devices configured to access the at least one dynamic memory
a refresh controller configured to control a refresh of the at least one dynamic memory, the refresh controller including:
  a FIFO memory configured to store and manage requests;
  a scheduler configured to reorder the requests based on one of priorities assigned to the master devices and provide information about following requests;
  a refresh control unit configured to determine a refresh timing of the dynamic memory based on existence of the following requests and an idle state of banks constituting the dynamic memory; and
a signal generator configured to generate a refresh trigger signal that refreshes the dynamic memory; and
a plurality of buses that connect the dynamic memory and the refresh controller and the master device.

17. A method of controlling refresh of dynamic memory, comprising:
storing requests from a master deice to manage the requests;
reordering the requests based on one of priorities assigned to the master device and information about following requests;
determining a refresh timing of the dynamic memory based on existence of the following requests and an idle state of banks that constitute the dynamic memory, the step of determining the refresh timing of the dynamic memory including:
  controlling each bank of the dynamic memory; and
  determining a refresh interval of the dynamic memory; and
generating a refresh trigger signal that refreshes the dynamic memory.

18. The method of controlling refresh of dynamic memory of claim 17, wherein the refresh interval of the dynamic memory is determined based on monitoring the following requests during a first time interval from tREFImax minus ACCESS_LENGTHmax to an ending point of tREFImax, tREFImax representing a maximum refresh interval of the dynamic memory, and ACCESS_LENGTHmax representing a maximum access interval of the requests of the master device.

19. The method of controlling refresh of dynamic memory of claim 17, wherein the requests are reordered or the information about the following requests is provided based on the existence of the following requests.

20. The method of controlling refresh of dynamic memory of claim 18, wherein the priority given to the master device is determined based on sensitivity to a response latency of the requests.

21. The method of controlling refresh of dynamic memory of claim 20, wherein a management order is changed based on the determined priority.

22. The method of controlling refresh of dynamic memory of claim 18, wherein the dynamic memory is refreshed when all banks of the dynamic memory are in an idle state and when the following requests are not found during the first time interval.

23. The method of controlling refresh of dynamic memory of claim 18, wherein the dynamic memory is refreshed when all banks of the dynamic memory are in an idle state and at a point when the following requests are found.

* * * * *